United States Patent [19]

Scriminger et al.

[11] 4,160,632
[45] Jul. 10, 1979

[54] APPARATUS TO DISPOSE OF FLY ASH

[75] Inventors: William F. Scriminger; William H. Ricketts, both of Muskogee, Okla.

[73] Assignee: Muskogee Environmental Conservation Co., Muskogee, Okla.

[21] Appl. No.: 894,915

[22] Filed: Apr. 10, 1978

Related U.S. Application Data

[63] Continuation-in-part of Ser. No. 776,115, Mar. 10, 1977, abandoned.

[51] Int. Cl.² .................................................. B29C 5/02
[52] U.S. Cl. ........................................... 425/62; 425/73; 425/584; 425/546
[58] Field of Search ................. 425/584, 62, 73, 546; 264/DIG. 49

[56] References Cited

U.S. PATENT DOCUMENTS

| 3,698,578 | 10/1972 | Flittie | 425/62 |
| 3,881,707 | 5/1975 | Toto | 425/62 |

Primary Examiner—Robert F. White
Assistant Examiner—James R. Hall
Attorney, Agent, or Firm—James H. Chafin

[57] ABSTRACT

A system for disposing of fly ash where the dry fly ash is transported by pneumatic hose to a portable container which is utilized in the manner of a mold. The container is of a general truncated pyramidal shape, closed at the top end and open at the bottom. The fly ash is blown into the container and simultaneously wetted by sprayed liquid within the container. The air which is used for transporting the fly ash is removed from the container by a filtering system and the fly ash is allowed to harden into cement-like ingots or cakes for further handling thereof.

10 Claims, 9 Drawing Figures

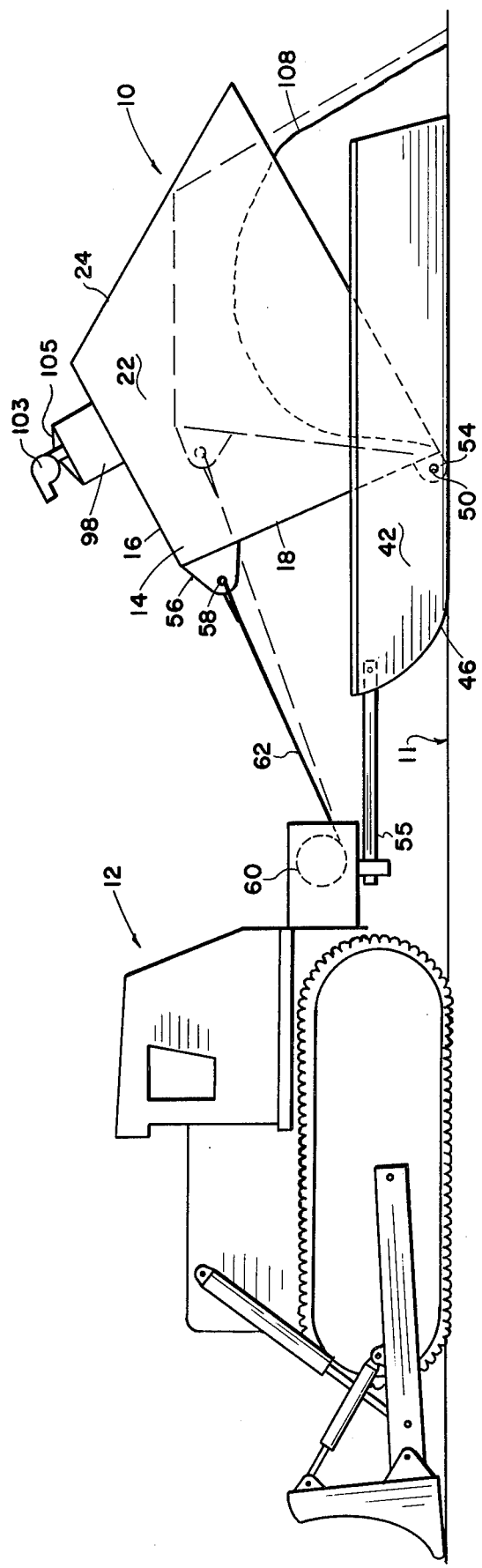
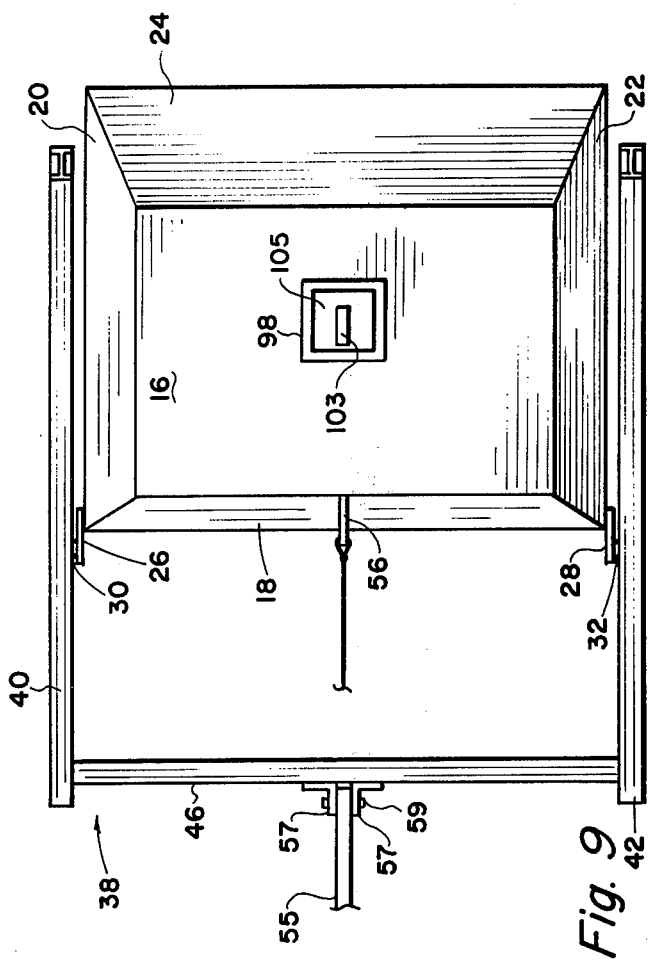
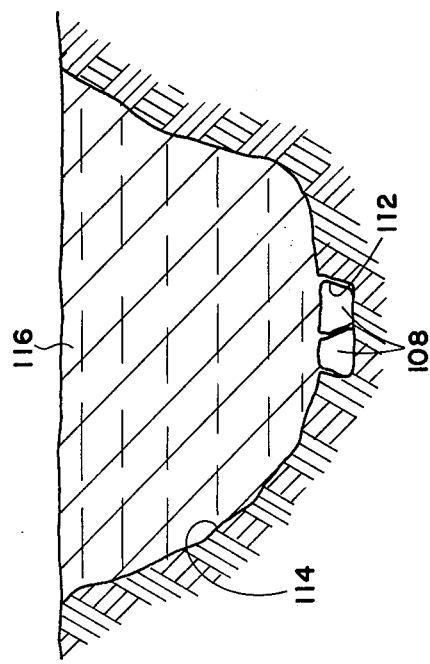
Fig. 1
Fig. 9
Fig. 8

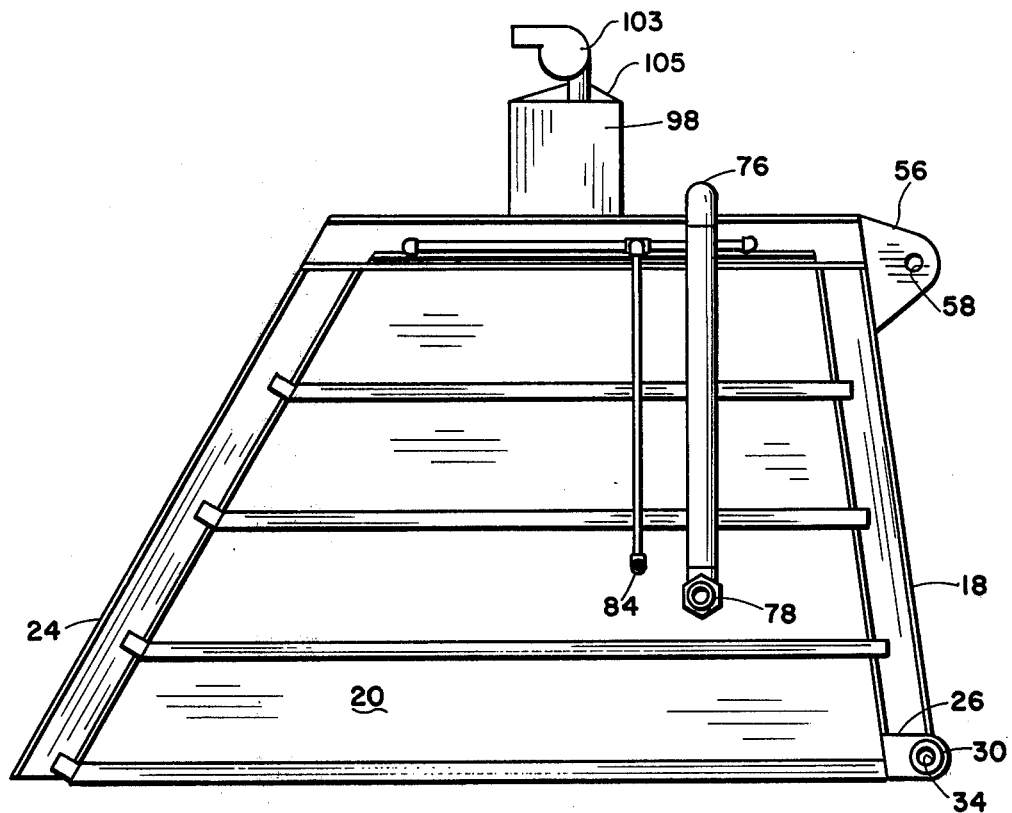
Fig. 4
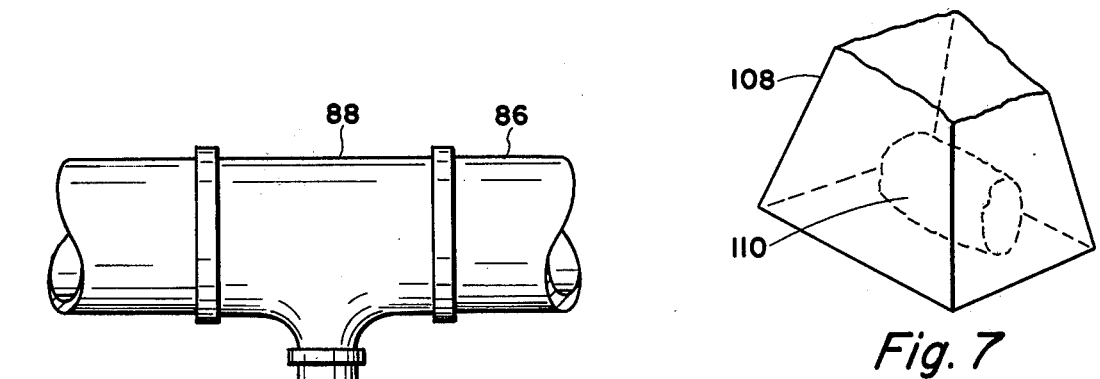
Fig. 5
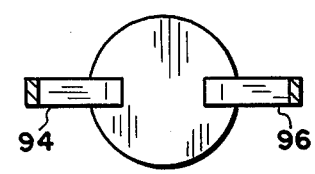
Fig. 7
Fig. 6

APPARATUS TO DISPOSE OF FLY ASH

CROSS-REFERENCE TO RELATED APPLICATION

This application is a continuation-in-part application of our co-pending application Ser. No. 776,115, filed Mar. 10, 1977, now abandoned and entitled "Apparatus to Dispose of Fly Ash."

BACKGROUND OF THE INVENTION

1. Field of the Invention

The present invention relates to a waste disposal system, and more particularly, but not by way of limitation, to a system for collecting fly ash and solidifying same for easy efficient handling thereof.

2. Background of the Invention

One of the age old problems associated with the burning of coal or more particularly pulvarized coal in furnaces for boilers and the like is that of disposing of the fly ash residue. Fly ash is considered a waste material which is a finely divided ash residue produced by the combustion of pulvarized coal. This fly ash residue is typically prevented from being carried off with the exhaust gases of the furnace by use of fly ash collection means such as electrostatic precipitators or bag houses.

The fly ash is more accurately described as a heterogeneous mixture of both crystalline and non-crystalline particulate material which includes a variety of chemical elements in various forms including, among others, potash ($K_2O$), lime ($CaO$), zinc oxide ($ZnO$) and borax ($B_2O_3$).

Fixed containers or silos for holding the fly ash must be carefully constructed to prevent release of this light wispy substance into the atmosphere where it would quickly become a major source of pollution in the area of the furnace. If the fly ash is stored in a silo or bin, care must be taken to protect it from the elements since when wetted and packed it sets up and hardens not unlike cement. In fact its cement-like characteristics have led enterprising inventors in the past to attempt to use fly ash in building blocks for construction. With the increased use of coal in electric power plants and the like in an effort to postpone the petroleum fuel crises, the problem of disposing of fly ash is rapidly taking on alarming proportions.

In summary, the fly ash must be constantly removed from the furnaces, it must be handled very carefully lest it become a major source of pollution and it must be ultimately disposed of in a way so as not to upset the delicate ecological balance.

SUMMARY OF THE PRESENT INVENTION

The present invention provides an efficient and ecologically sound system for disposing of fly ash residue from coal burning furnaces of power plants and the like.

The system provides a substantially truncated pyramidal shaped container for receiving the dry fly ash which is blown into the container by pneumatic hoses and the like. The attendant air pressure within the container is relieved by a filtering system including an exhaust blower to maintain a slight negative pressure within the container, to prevent the escape of the dry fly ash into the atmosphere.

As the fly ash is entering the container at the top thereof, a plurality of spaced liquid nozzles located in the upper portion of the container provide a spray in order to wet and settle loose fly ash on the ground or supporting surface at the open bottom of the container.

As the fly ash is being blown into the container, exhaust blower in conjunction with the filtering system, is turned on. The exhaust blower is sized such that it will create a negative pressure within the container which causes the container to be forced downwardly against the ground thereby more efficiently effecting a seal around the lower edge thereof, or if not sealing the lower edge, cause air to be drawn in around the edge preventing accidental expulsion of fly ash before it is effectively wetted.

This wetting procedure not only serves to settle and compact the loose fly ash, the fly ash will react with the water or liquid and set up into a solid cake, much in the same manner as cement. The fly ash will further tend to form a solid cake conforming to the pyramidal shape of the inside of the container.

The container is carried by a plurality of skid members and is pivotally mounted to the skid members. After the container is filled to a desirable level within the container, the slope of the walls of the container is such that the container may be tilted off of the fly ash cake without disturbing the fly ash whereby the container may then be moved to a new location where the process is repeated.

The formed fly ash cake will remain in a solid state requiring only occasional wetting to prevent the outer surface from becoming completely dry. Further the pyramidal shape thereof will resist most weather conditions and therefore may be temporarily stored at the site.

The formed fly ash cakes are then suitable for loading and hauling to a subsequent location for either processing as a byproduct or permanent disposal. Often, in strip coal mining operations, when the overburden is replaced, original land contours cannot be restored due to the previously removed coal seam (deposit). Where the original land contours are desired, the fly ash cakes may be deposited in place of the removed coal seam before the overburden is replaced.

By utilizing the fly ash as a fill in the bottom of the coal mine gives rise to a second valuable feature of the invention. Since there is often the presence of acid mine water in the coal pit, the alkaline or metal oxide content of the fly ash will tend to neutralize the acid while still providing the necessary or needed filler.

Related to this feature of the present invention is that of the disposal of industrial waste acids whereby these acids may be delivered to the site of collection of fly ash. In this case, instead of using water as a wetting solution within the container for compacting the fly ash in the container, acid would be utilized instead. The result would be to neutralize the acid while not substantially affecting the setting up or hardening characteristics of the fly ash.

The container may further provide a means for encapsulating solid wastes or sludges by first unloading these waste materials into a depression or into a pit floor, placing the pyramidal container over the waste material and covering the same with a wetted fly ash to form a fly ash concrete type cover.

It is noted that this need not be done at a pit or disposal site, the solid waste materials may be deposited under the container at the furnace site whereby fly ash is blown into the container, wetted and allowed to form a capsule around the solid waste. The entire fly ash cake with the solid waste encapsulated inside may then be transported to a disposal site.

DESCRIPTION OF THE DRAWINGS

Other advantageous of the present invention will hereinafter more fully appear in connection with the detailed description of the drawings in which;

FIG. 1 is a side elevational view of fly ash disposal system and associated container towing vehicle.

FIG. 4 is a side elevational view of the container of FIG. 1.

FIG. 5 is a detailed elevational view of a typical liquid inlet nozzle for the container in FIG. 1.

FIG. 6 is a sectional plan view of a portion of the nozzle of FIG. 5 taken along the broken lines 6—6 of FIG. 5.

FIG. 7 is a perspective view of a fly ash cake formed by the use of the container of FIG. 1.

FIG. 8 is a sectional elevational view of a coal strip pit or disposal pit having fly ash cakes deposited therein.

FIG. 9 is a plan view of the container in FIG. 1 depicting the skid member attached thereto.

DESCRIPTION OF THE PREFERRED EMBODIMENT

Figure 3:
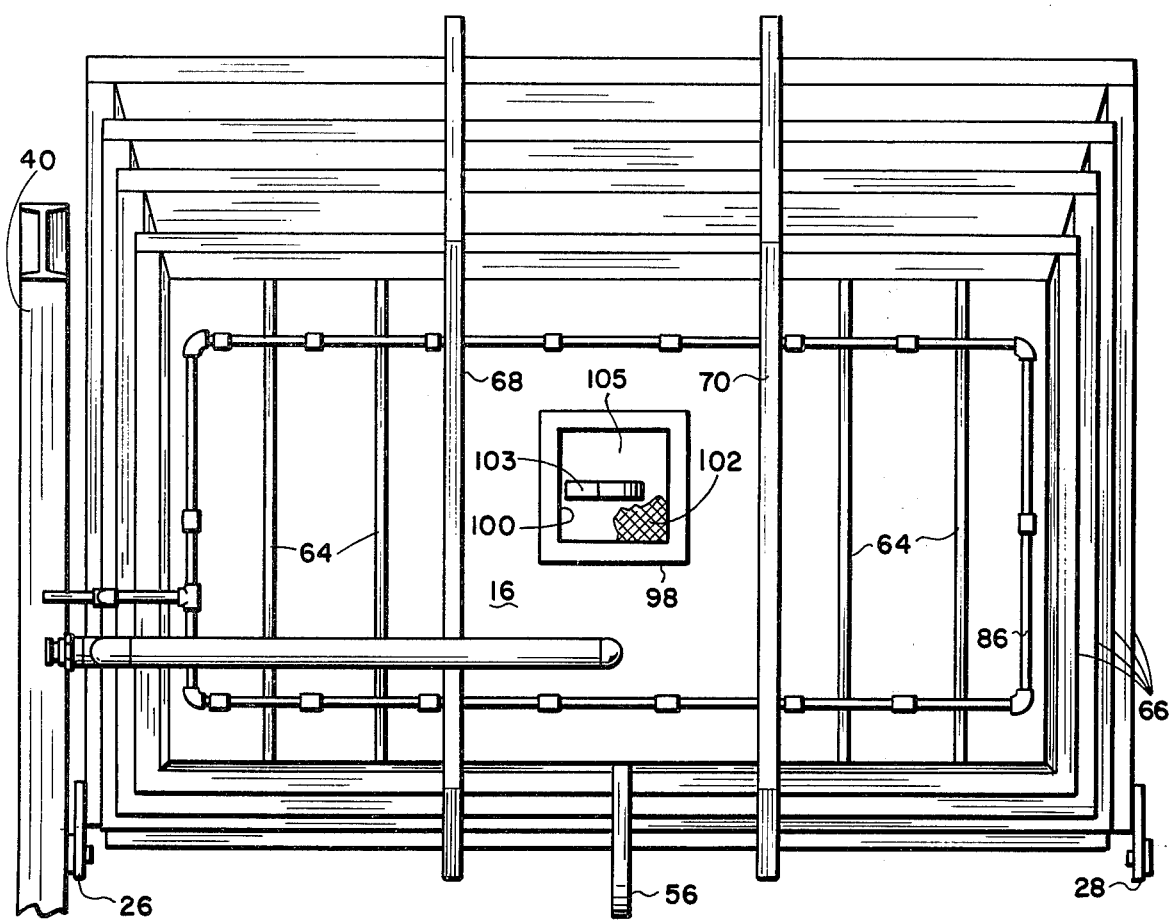
FIG. 3 is a top plan view of the container of FIG. 1.

Referring to the drawings in detail, reference character 10 generally indicates a fly ash disposal system connected to a suitable container towing vehicle 12. The disposal system 10 generally comprises a truncated pyramidal shaped container 14 closed at the top by a top panel member 16 and having a generally downwardly and outwardly extending front wall member 18, oppositely disposed sloping sidewall members 20 and 22, and a rear sloping wall member 24 opposite the front wall member 18. It is noted that the rear wall member 24 is provided with a greater degree of slope than the other wall members for a purpose that will be hereinafter set forth. The bottom of the container is open and when setting in a vertical position as shown by the dashed lines in FIG. 1, rests directly on the ground or other smooth surface generally indicated by reference character 11.

A pair of pivot attachment ears 26 and 28 are attached to the lower forward edges of the container 14, each being provided with outwardly extending boss members 30 and 32, respectively. Each ear member 26 and 28 and their associated boss members are provided with a horizontally, traversely extending bore 34 and 36 therein.

A towing or skid apparatus indicated by reference character 18 generally comprises a pair of oppositely disposed parallel skid members 40 and 42, each having runner surfaces 44 and 46 respectively, said runner surfaces being curved upwardly at the front ends thereof to provide a sled-like configuration. The skid members 40 and 42 are spaced apart transversely by means of a horizontal connecting bar 46 secured to and between the front end portions thereof by any well known manner such as welding. The skid members 40 and 42 may be conveniently constructed from a pair of steel eye beams as shown in the drawings or from any other suitable material. The skid apparatus 38 further comprises a tow bar 55 which is pivotally mounted to the forward central portion of the cross bar 46, by means of the brackets 57 and associated pin member 59, for connection to the tow vehicle 12 in any well known manner.

Spaced from the front portions of the skid members 40 and 42 are a pair of aligned bores 48 and 50 located near the base or near the runner surfaces 44 and 46, respectively. The bores 48 and 50 are positioned so that the container 14 may be pivotally attached thereto by means of pin members 52 and 54. The pin member 52 extends through the skid bore 48 and the bore 34 provided in the ear 26 and associated boss member 34 of the container. The pin member 54 likewise extends through the bore 50 in the skid 42 and bore 36 provided in the ear member 28 and associated boss 32.

A winch attachment means 56 is secured to the upper portion of the front wall member 18 and is centrally located between the side walls 20 and 22. The winch attachment member 56 is provided with a bore 58 therethrough for attachment to a winch 60 located on the towing vehicle 12 by means of a cable 62. It is noted that the container could be constructed with a powered winch located at the winch attachment means 56 so that the cable 62 might be attached directly to the towing vehicle.

It is also noted that at this point the towing vehicle while shown to be a blade type dozer may be of any other configuration such as a truck or other vehicle means. Referring to the container drawings in detail, particularly FIGS. 2, 3 and 4, the closed top member 16 of the container 14 may be constructed of a suitable sheet metal which is reinforced by a plurality of channel members 64. The front, rear and side wall members 18, 20, 22 and 24 may be constructed of a similar sheet metal and reinforced by vertically spaced horizontal stringers 66. For further stiffening of the container, a pair of spaced stiffeners 68 and 70 extend from the lower front portion of the container, up the front wall member 18, across the top panel member 16 and down the rear wall member 24 to the base of the container.

An elongated vertically disposed fly ash inlet nozzle 72 extends through a suitable bore in the top panel member 16 to provide communication with the interior of the container 14. The nozzle 72 may be flared at 74 to provide for more even distribution of the fly ash passing therethrough in a manner that will be hereinafter set forth. Connected to the outer end of the nozzle member 72 is a suitable pneumatic hose or pipe 76 having inlet connection means 78 at the outer end thereof. The piping 76 and associated nozzle 72 are all supported by suitable frame members on the container in any well known manner (not shown).

Also spaced throughout the inside surface of the top member 16 are a plurality of liquid inlet nozzles 80 which are shown in greater detail in FIG. 5. Each nozzle 80 is provided with a vertically disposed inlet pipe 82 which extends through the top panel member 16 into the interior of the container 14. All of the various liquid nozzles 80 are connected to a liquid inlet pipe 84 by means of a suitable manifold 86 which is supported by the top panel member 16. The liquid inlet nozzles generally comprise a T-member 88 which is connected to the manifold 86 on the top of the container 14. Each downwardly extending pipe member 82 is connected to the T-member 88 and extend through a plurality of bores 90 provided in the top panel 16. A plurality of splash plates 92, one for each liquid inlet nozzle 80 is positioned directly below the open end of the vertical inlet pipes 82 and are supported in place by a pair of suitable bracket members 94 and 96. The brackets are attached to the splash plates and the inside surface of the panel 16 by any well known means such as by welding.

An air filter box 98 is attached to the upper surface of the top panel 16 and is provided with an opening 100 therethrough. The opening 100 extends vertically through the filter box 98 and through the top panel member 16 into communication with the interior of the container 14. Disposed in the opening 100 is a suitable array of filters 102 which are sufficient for allowing air to escape therethrough in order to prevent fly ash or dust from passing out of the container.

Also disposed above the opening 100 and above the filter array 102 is an exhaust blower 103 connected to a suitable hood 105 which covers the opening 100. The blower 103 is sized so that it will exhaust filtered air from the inside of the container slightly faster than the incoming air carrying the fly ash in order to create a partial vacuum within the container. The negative pressure inside the container is relieved by air coming in around the bottom edge and through any cracks or other small openings in the container.

In the operation of the fly ash disposal system, the container 14 and associated skid means 38 are positioned on the ground or other smooth surface 11 near a coal burning furnace or the like. The fly ash removal system from the furnace (not shown) is then connected to the fly ash inlet connector 78 and the fly ash is transported by compressed air through the inlet pipe 76 and into the container through the nozzle 74. Simultaneously, the blower 103 is started in order to create a negative pressure within the container which helps draw the fly ash in and prevents it from escaping around the lower edge before it is wetted.

Figure 2:
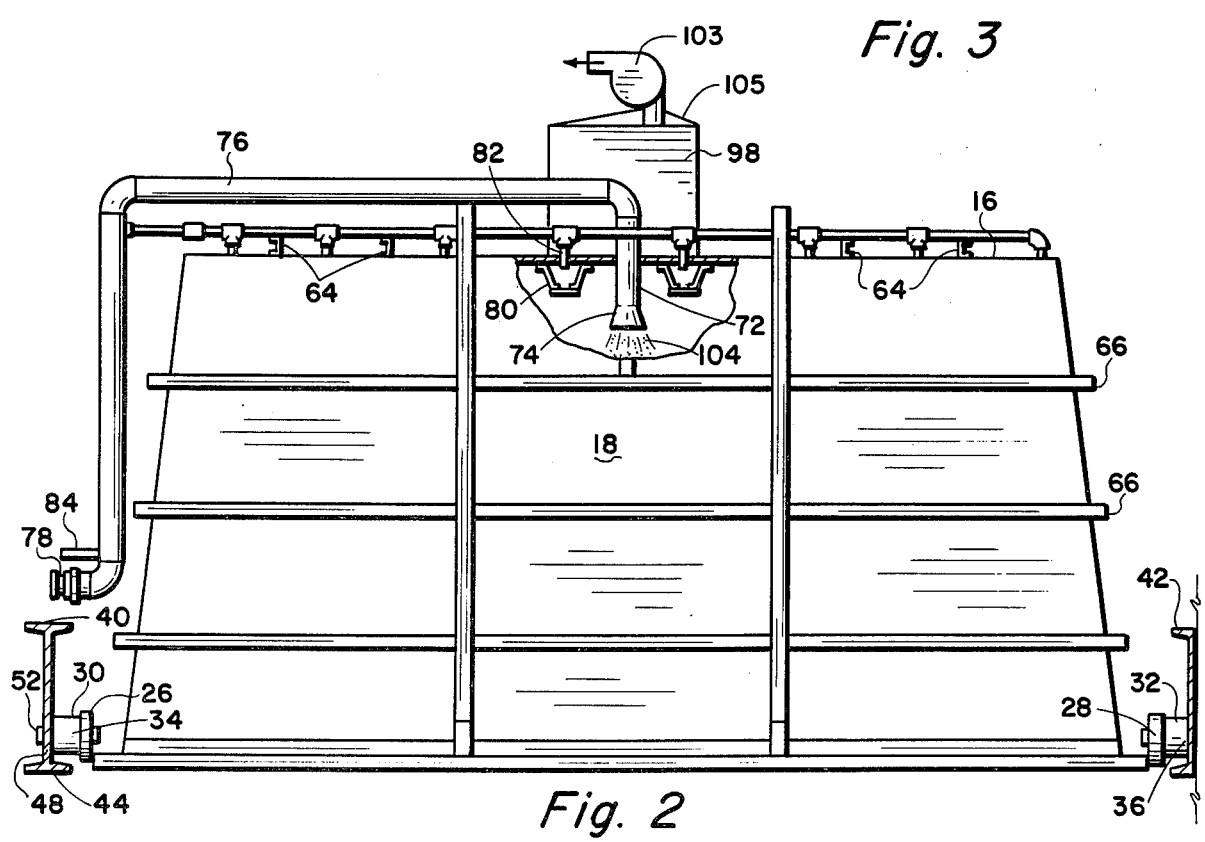
FIG. 2 is a front elevational view of the container of FIG. 1.

The fly ash, being suspended by air will completely fill the inside of the container. As the fly ash enters the container as shown in FIG. 2 depicted by reference character 104, water or other suitable liquid is sprayed into the container by the plurality of liquid inlet nozzles 80 which tends to strip the fly ash from the air within the container and settle it to the ground or other smooth surface 11.

Referring now to FIG. 5, reference character 106 depicts the liquid entering the container through the vertical inlet pipe 82 where it is forced downwardly against the upper surface of the splash plate 92. The liquid then rebounds off the top surface of the splash plate 92 and into and throughout the container. The splash plate 92 serves to break up the liquid droplets to form what amounts to a combination of mist and liquid droplets. It is noted at this point that the liquid inlet system made up of the pipe 84, the manifold 86, the T-members 88 and the inlet pipes 82, should be made of material which would withstand corrosion due to water or industrial acids which may be used as a wetting medium.

The fly ash having entered the container will begin to fill the container to form a substantially compacted fly ash cake as depicted in FIG. 1 by reference character 108. Regardless of whether the wetting solution is of an industrial acid or water, the fly ash having been wetted and compacted into the cake 108 will tend to solidify or harden in much the same way as cement. After this setting up or hardening takes place, the towing vehicle 12 is attached to the tow bar 55 and the winch 60 is attached by means of the cable 62 to the winch attachment ear 56. The winch is then operated to tilt the container about its pivot pins 52 and 54 as shown in FIG. 1, until the lower rear edge of the container clears the top of the fly ash cake 108. Once the container has been tilted as shown in FIG. 1, the tow vehicle then pulls the entire container and skid assembly forward leaving the fly ash cake setting in place. If the fly ash cake must set for any length of time without the container 114, it is helpful to rewet it by a simple spraying operation so that it will maintain its hardened condition.

If it is desirable to dispose of solid industrial wastes or sludges, these components may be first deposited within the container and then encapsulated by the fly ash by the process described hereinabove.

FIG. 7 depicts a completed fly ash cake having encapsulated therein, industrial waste indicated by reference character 110.

It is further noted that these fly ash cakes, whether or not they have encapsulated, solid industrial waste, may be transported to a mining site and deposited within an excavated coal seam 112 within a pit 114. After depositing the fly ash cakes in the coal seam, the overburden 116 may then be added to complete the fill to the original earth contour.

It is noted that the mount of slope provided on the rear wall 24 is dependent upon the height of the container 14 and more particularly to the desired height of the completed fly ash cake 108 therein. Since tilting will be about the pivot pins 52, 54, the slope of the rear wall 24 should be such that a line extending from the pivot pin 54 to the rear wall 24, at a height h from the ground surface 11 will intersect the rear wall 24 at a right angle or perpendicular thereto. This perpendicular line is generally indicated in FIG. 1 by reference character 118. By designing the slope of the rear wall 24 in this manner, it is assured that as the container is tilted forward as shown in FIG. 1, the rear wall 24 will not contact or disturb the completed fly ash cake 108 therein.

It is further noted that although the front wall 18 and the side walls 20 and 22 of the container 14 are sloped inwardly and upwardly they may have a configuration which is substantially vertical. However, by having some slope as shown in the figures, there is further assurance of not disturbing the completed fly ash cake within the container during the tilting operation thereof.

It is further noted that basic shape of the container may be of any suitable configuration, such as a truncated cone, so long as it can be conveniently removed without disturbing the solid fly ash cake.

Whereas, the present invention has been described in particular relation to the drawings attached hereto, other and further modifications apart from those shown or suggested herein may be made within the spirit nd scope of the invention.

What is claimed is:

1. A fly ash disposal system comprising:
(a) a container enclosed by side walls and an upper closed top member, the bottom thereof being open, the said sidewalls being tapered upwardly and inwardly to the closed top member;
(b) fly ash inlet provided in the upper portion of the container for receiving air blown fly ash therethrough;
(c) liquid spray means carried by the container and disposed within the upper portion of the container for settling and caking the incoming fly ash;

(d) exhaust filter means carried by the upper portion of the container and in communication with the interior thereof;

(e) means attached to said container for assisting the removal of said container, and (f) removal means associated with said attached means for removing the container without disturbing the caked fly ash;

whereby fly ash is blown into the container through the fly ash inlet and is settled to the bottom thereof by liquid spray from the liquid spray means for ultimately hardening the fly ash into a fly ash cake, the resultant air being removed by expulsion through the filter means.

2. A fly ash disposal system as set forth in claim 1 wherein the side walls and closed top portion form a truncated pyramidal shape smaller at the top than at the bottom.

3. A fly ash disposal system as set forth in claim 1 wherein the fly ash inlet is substantially centrally located in the inside upper surface of the container.

4. A fly ash disposal system as set forth in claim 1 wherein the liquid spray means comprises a plurality of horizontally spaced spray nozzles below the inside surface of the top member and spaced from the fly ash inlet.

5. A fly ash disposal system as set forth in claim 4 wherein each nozzle comprises a downwardly extending inlet pipe, a horizontally disposed splash plate spaced directly below said inlet pipe, said area above said splash plate being in substantially open communication with the interior of said container.

6. A fly ash disposal system as set forth in claim 4 wherein the liquid spray means comprises a liquid receiving pipe secured to the outer surface of the container, a distribution manifold carried by the closed top member and operably connected in open communication with the spray nozzle.

7. A fly ash disposal system as set forth in claim 1 wherein the container has a rectangular base, pivot attachment means connected to the base of one side thereof, the opposite side member being sloped upwardly and inwardly to the rear edge of the closed top member by an amount such that a cake of compacted fly ash contained therein will not be disturbed when said container is pivoted about the pivot attachment means.

8. A fly ash disposal system as set forth in claim 7 and including skid means and wherein the container is pivotally carried by said skid means.

9. A fly ash disposal system as set forth in claim 8 wherein the skid means comprises a pair of horizontally spaced runners, one disposed on each side of the container, hitch means carried by the runners for connection with a towing vehicle, winch connection means carried by the upper portion of the container opposite the sloped side member, and winch means operably connectable between the winch connection means and the tow vehicle for tilting the container off the caked fly ash.

10. A fly ash disposal system as set forth in claim 1 wherein the exhaust filter means comprises an exhaust blower sized to remove air through a filter at a rate faster than it is entering from the fly ash inlet.

* * * * *